H. HENNEBUTTE.
CONVERSION OF COAL TAR, PETROLEUM RESIDUES, CREOSOTE AND SCHIST OILS, AND THE LIKE, INTO PITCH.
APPLICATION FILED JUNE 7, 1912.
1,044,175.
Patented Nov. 12, 1912.
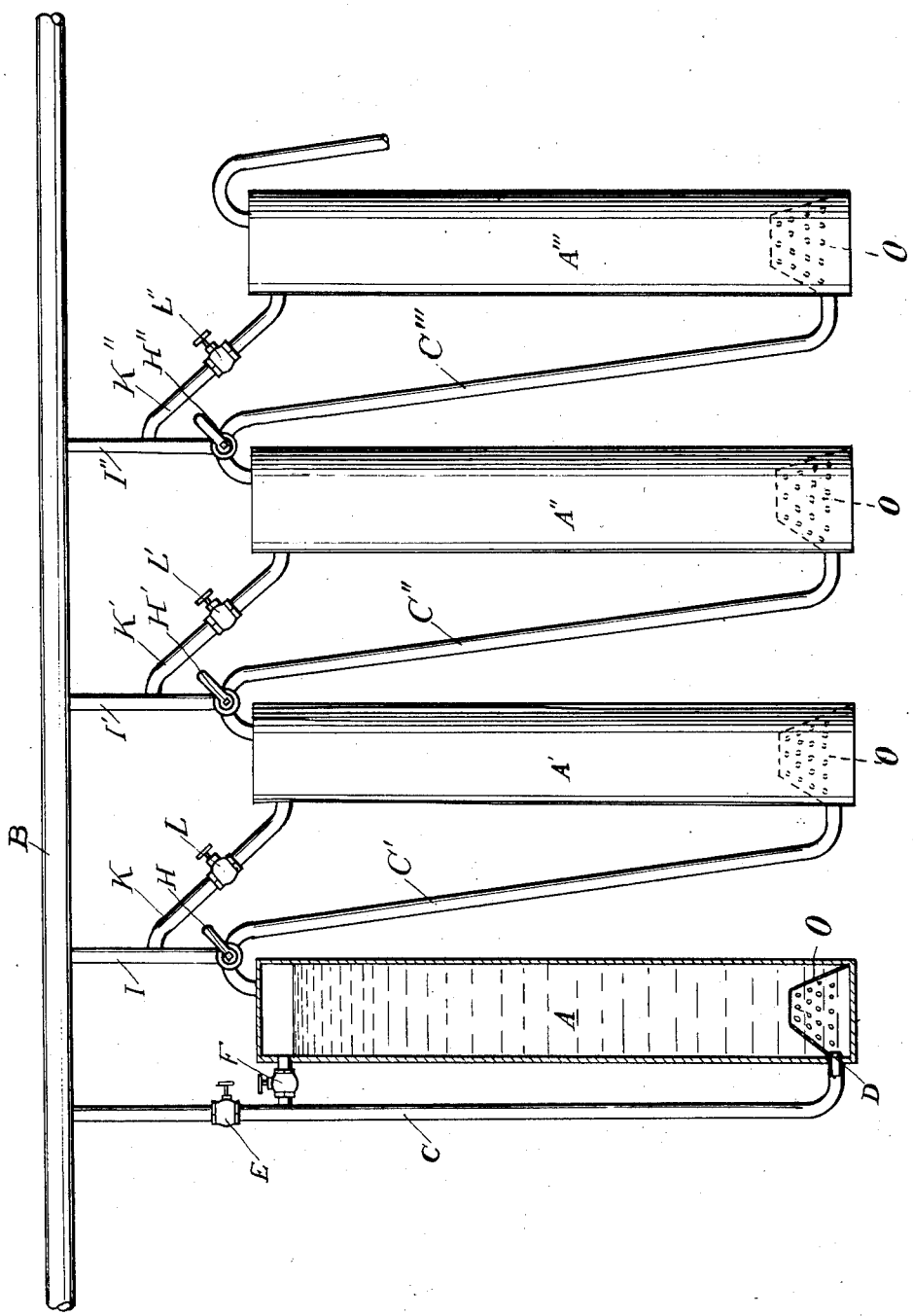

UNITED STATES PATENT OFFICE.

HENRI HENNEBUTTE, OF PARIS, FRANCE.

CONVERSION OF COAL-TAR, PETROLEUM RESIDUES, CREOSOTE AND SCHIST OILS, AND THE LIKE, INTO PITCH.

1,044,175.  Specification of Letters Patent.  Patented Nov. 12, 1912.

Application filed June 7, 1912. Serial No. 702,288.

*To all whom it may concern:*

Be it known that I, HENRI HENNEBUTTE, a citizen of France, residing at 25 Rue Pigalle, Paris, France, have invented certain new and useful Improvements in the Conversion of Coal-Tar, Petroleum Residues, Creosote and Schist Oils, and the Like, into Pitch, and that I do hereby declare the following to be a full, clear, and exact description of the invention, such as will enable others skilled in the art to which it appertains to make and use the same.

It is impossible to completely convert without notable loss due to distillation ordinary coal tar or naphthalene and anthracene residues, creosote and schist oils, and petroleum residues, into pitch by merely treating these hydrocarbons with a current of air at a raised temperature, as the chemical reaction that is necessary for the withdrawal of hydrogen is insufficient, and as the substances thus treated are partly distilled. If such hydrocarbons however are dissolved in a suitable medium such as tar with a high boiling point, the dissolving action of the tar will prevent distillation and it will be possible to increase the temperature at which the mixture is treated and render the chemical reaction more thorough. The action of a current of air above 100° C. (one hundred degrees Celsius) on creosote and schist oils or on petroleum residues is twofold and produces, firstly a mechanical effect which increases as the velocity of the air current is increased and facilitates distillation, and secondly a chemical effect which results in a partial oxidation or a withdrawal of hydrogen and which increases as the temperature and pressure or the duration of the reaction are increased. These three factors, temperature, pressure and time of duration, are all important in producing the desired result and may be increased to such an extent that all the oxygen of the air is used up and the chemical reaction attains its maximum effect, whereas the mechanical action of the current of air is reduced to a minimum. The temperature should be kept low, say between 100° C. and 250° C. as a high temperature will not only increase the chemical reaction but will at the same time facilitate distillation, and the latter is to be avoided.

The present invention relates to a process in which the whole chemical effect of a current of air on the hydrocarbons referred to is obtained by the combined action of heat, pressure, and the duration of contact between the air and the hydrocarbons to be treated, the operation being carried out without distillation and the hydrocarbons referred to being mixed with a suitable solvent, such as tar.

According to this invention the hydrocarbons to be treated are mixed with a solvent, such as tar, the boiling point of which is higher than that of the liquid hydrocarbons to be treated, so that such tar may counteract distillation.

In the accompanying drawings the figure represents a side view of a series of columns and connections used in carrying out my process, one of the columns being shown in section.

The mixture to be treated is heated to a temperature of 110° C. (one hundred and ten degrees Celsius) and is submitted to the action of a current of air which is fed to the mixture under pressure and in a divided condition. The pressure of the air ought to be sufficiently low to enable all the oxygen in the injected air to be absorbed. The mixture is placed in an apparatus provided with columns A, A', A'' and A''' these columns being connected together by conductors C, C', C'', and C''' having cocks F, H, H', and H'' so that the gas current escaping from a column may penetrate to the lower part, either of the next column or each of the following columns. In this way it is possible to isolate a column in which the treatment of the matters will have been completed and to allow fresh air into one of the following columns. In order to inject a good division of the air, I employ to lead it into each of the columns one or more twyers or perforated conductors O. I can also maintain an equal pressure by means of by-passes K, K' and K'' having valves L, L', and L''. When the product of the first column has reached the desired condition, I close the air admission into this column by the means of cock E. The opening of three-way cock H and closing of cock E gives admission to air containing the normal amount of oxygen into the second column A' by way of conductors I and C'. The second column then becomes the reaction column and so on.

I' and I" are conductors for leading air to columns A" and A''' similar to the conductors C and M.

The current of air entering the columns at the bottom thereof penetrates the lower part of and goes through the mass being treated beginning to react under a pressure as previously described. The pressure of the air must be increased if several columns of liquid are treated simultaneously. The action of the air is at its maximum in the first column, as it parts in this column with practically all its oxygen. The temperature of the tar oils treated in this column is soon increased by the exothermic reaction thus produced, whereas the chemical reaction would begin to slacken if the temperature remained constant. The air current is afterward passed from the first column A to the following columns. The vapors carried away from the first column by the hot air from which most of the oxygen has been separated are absorbed in the following columns A', A", etc., and the temperature of the latter is raised to some extent by the hot current of air. It will also be understood that the exothermic reaction which takes place in the second column will cause the temperature in this column to be additionally raised. The temperature of the subsequent columns cannot be increased like that of the first and second columns, except by the sensible heat of the air, as the air passed into these columns is deprived of oxygen and therefore not capable of producing a chemical reaction. The air current supplied to the subsequent series of columns merely carries forward the calories it possesses. The vapors carried away by such air current as it emerges from the first column are entirely dissolved in the following columns and the latter form a mixture that will afterward likewise be submitted to the direct action of a current of air admitted through one of the air conduits I, I' and I" according to which column contains the mixture. When the reaction is sufficiently advanced in the first column such column is cut off, and the pitch which it contains is let out by means of a cock (not shown) and a new charge is supplied to the column.

The addition of dissolving tar to the hydrocarbons treated with a divided air current according to this invention will allow of the temperature being increased by the chemical action which takes place to 250° C. (two hundred and fifty degrees Celsius) in the case of coal tar, and 320° C. (three hundred and twenty degrees Celsius) in the case of petroleum residues, without incurring any appreciable distillation.

This method of treatment will allow of rapidly and economically converting the products referred to into pitch that can be used for the manufacture of briquets, electric insulators, artificial asphaltum and the like, the factors, pressure, and duration of contact, both acting to increase the chemical reaction and prevent distillation and their action is therefore of considerable advantage.

In order to increase the pressure any suitable number of columns may be arranged in connection with each other and all submitted to the action of the same current of air. If convenient some suitable resistance or pressure valve (not shown) may moreover be placed at the outlet for the gases.

The columns as shown are connected together by suitable piping so that the air current which escapes from one of the columns may be passed into the lower portion of the next column or of all the following columns. It is thus possible to cut off any column of hydrocarbons that has been sufficiently treated and pass the direct current of fresh air into the next column, suitable valves and cocks being provided for this purpose.

In actual practice good results have been obtained by placing one thousand (1000) kilograms of tar and two hundred (200) kilograms of naphthalene or other oils in a column two to three meters in diameter and six to ten meters high, heating the contents to about 100° C., then forcing air into the base of the column at the rate of about five (5) liters per minute per kilogram of material being treated.

Having now particularly described and ascertained the nature of my said invention and in what manner the same is to be performed I declare that what I claim is:

1. The process of transforming a mixture of tar of high boiling point and oil into pitch which consists in supplying to a heated mass thereof a current of air driven thereinto, by a force only about sufficient substantially, to force the air therethrough, the oxygen being nearly all absorbed by the mixture causing a transformation thereof.

2. The process of transforming a mixture of tar, of high boiling point and oil into pitch consisting in supplying to a heated mass thereof a current of air driven thereinto, by a force sufficient substantially, to force the air therethrough, the oxygen being nearly all absorbed by the mixture causing a transformation thereof, and conducting the gas arising from the subject of operation into a second body of the same material, whereby said second body will be preheated and to some extent transformed by the vapor escaping from the first body.

3. The process of transforming a mixture of tar of high boiling point and oil into pitch consisting in directing air through several columns, in the first of which practically all of the oxygen is removed, and then producing transformation, the air current freed of oxygen carrying vapors which it deposits in the second column.

4. Process for the treatment of comparatively light naphthalinated or anthracenic oils, creosoted oils, schist oils, or of others of this kind consisting in mixing these oils with tar whose boiling point is higher than the above mentioned oils in order to transform the same more or less completely into pitch by subjecting them at an appropriate temperature to the action of air introduced under pressure.

5. Process for the treatment of petroleum oils in making pitch consisting in placing a mixture of tar and said oils in a vertical column, blowing air into said mixture at the bottom thereof, under a pressure of at least 2 atmospheres, said pressure resulting from the static load only which results from a vertical column of tar heated to a temperature of between 110 and 220 C. in starting progressively with about 110 C., the escaping air retaining the hydrocarbon vapors being directed into a recipient which contains a determined quantity of tar intended for further treatment.

In witness whereof I have hereunto set my hand in the presence of two witnesses.

HENRI HENNEBUTTE.

Witnesses:
   ROSEN ROSEN,
   H. C. COXE.